March 28, 1933.  T. R. HARRISON  1,902,852
METER MECHANISM
Filed Jan. 11, 1929
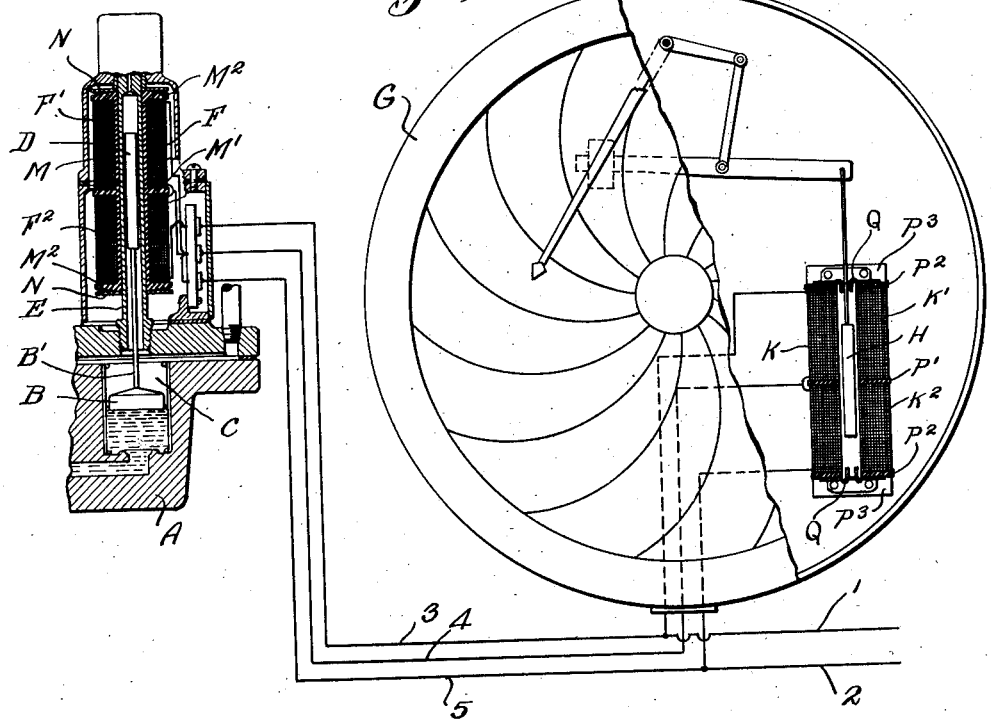
Fig. 1,
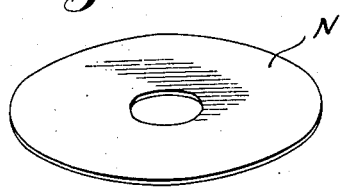
Fig. 2,
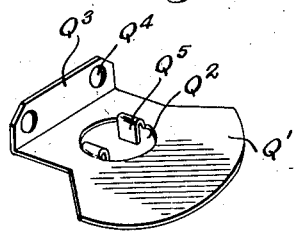
Fig. 3,
INVENTOR.
THOMAS R. HARRISON
BY
ATTORNEY Patented Mar. 28, 1933

1,902,852

UNITED STATES PATENT OFFICE

THOMAS RANDOLPH HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

METER MECHANISM

Application filed January 11, 1929. Serial No. 331,934.

The present invention relates to distant reading meter mechanism comprising electro-magnetic transmitting and receiving elements each of which includes a magnetic body movable axially in a coil comprising two end to end sections. In this type of meter mechanism, one instance of which is disclosed in my prior Patent, No. 1,743,852, January 14, 1930, the sections of the coils of the transmitting and receiving elements are so connected that axial movement in its coil of the magnetic body of the transmitting element will produce corresponding axial movements in its coil of the magnetic body of the receiving element. The magnetic body of the transmitting element may have its movements imparted to it by a differential pressure gage or analogous meter element proper, and the movements of the magnetic body of the receiving element may actuate any suitable exhibiting mechanism. The various coil sections are connected into an inductance bridge which is unbalanced by axial movements of the magnetic body of the transmitting element, and this unbalance of the bridge produces axial movements of the magnetic body of the receiving element required to rebalance the bridge.

The object of my present invention is to provide improvements in the construction of the said coils, and particularly to provide a simple and effective method of, and means for, electrically balancing the inductance bridge, and particularly for compensating for irregularities in the winding of the coil of the receiving element and for making more definite and certain the desired float action of the magnetic body of the receiving element.

The various features of novelty which characterize my invention are pointed out with particularity in the claims annexed to and forming a part of this specification. For a better understanding of the invention, however, and the advantages possesesd by it reference should be had to the accompanying drawing and descriptive matter in which I have illustrated and described a preferred embodiment of the invention.

Of the drawing:

Fig. 1 is a diagrammatic representation of meter mechanism incorporating my invention with certain parts broken away and in section;

Fig. 2 is a perspective of the transmitter coil end plate; and

Fig. 3 is a similar view of the receiver coil end plate.

In the drawing and particularly in Fig. 1 I have illustrated meter mechanism comprising a differential pressure device or manometer A of the type having interconnected high and low pressure chambers adapted to be connected to the high and low pressure sides respectively, of a pressure difference creating device. Such arrangements are well known in the art and as they form no part of the invention, detailed illustration is unnecessary. As usual the manometer chambers are partially filled with a sealing liquid, such as mercury. A metallic float B is positioned on the mercury in the high pressure chamber C and responds to the variations in the liquid level therein. The upper end of the float is connected through a non-magnetic rod B' to a magnetic body or armature D, which is axially movable in and guided by a pressure-tight tubular casing member E of non-magnetic material. The lower end of the casing is open and secured in an aperture formed for that purpose in the manometer casing, the upper end of the tube being closed.

The indicating or recording section G of the meter mechanism comprises a vertically movable magnetic body or armature H to which the movements of the armature D are transmitted by elector-magnetic means. The last mentioned means in the construction illustrated, comprises an impedance bridge which includes a transmitter coil F divided into two sections F', and $F^z$ surrounding the tube E and placed end to end and so disposed that when the armature D is moved vertically by the change in level of the sealing liquid in the chamber C, the inductance of the coil section F' is increased or decreased, respectively, relative to the inductance of the coil section $F^z$. The impedance bridge also includes a receiver coil K divided into coil sections K' and K² arranged one above the other and surrounding the armature H and so connected into the impedance bridge that when the movement of the armature D unbalances the impedance bridge by varying the relative inductance of the coil sections F' and F², the electro-magnetic interaction between the armature and the coil sections K' and K² will move the armature H downward or upward accordingly as the movement of the armature D is upward or downward, respectively, as required to rebalance the impedance bridge. Each pair of coil sections are connected in series between alternating current supply conductors 1 and 2 and in parallel with the corresponding coil sections of the other pair by conductors 3, 4, and 5, the sections of each pair being energized in the same direction so that magnetic poles are created at the remote and adjacent ends of each pair of coil sections of opposite polarity.

With the construction heretofore described when the armature D moves upward in response to an increase in the level of the sealing liquid, the inductance of the coil section F' is increased and the inductance of the section F² is decreased. This results in a decrease in the current flow through the coil sections F' and K' and an increase in the flow through the coil sections F² and K². With the armature H mechanically counterbalanced the increase of current flow in the section K² relative to the flow in the section K' moves the armature H downward until the opposing electro-magnetic interactions between the armature and between the coil sections K' and K² are equal to one another in intensity. This condition is reached when the ratio of the inductances of the coil sections K² and K' becomes equal to the ratio of the inductances of the coil sections F' and F² and the impedance bridge is thereby rebalanced. Similarly other movements of the armature D produce corresponding movements of the armature H in proportion thereto.

The general features of construction and mode of operation of the meter mechanism to which my invention relates having been described, the present invention is particularly concerned with improvements in the construction and mode of operation of the divided inductance coils. In the usual process of assembly of the meter mechanism, each armature is mechanically balanced in the corresponding divided coil. As there is no objectionable friction between the armature and coil, little difficulty is found in mechanically balancing the parts. When the parts are found to be in mechanical balance, it is then necessary to electrically balance the sections of each coil because of the extreme difficulty in winding two coil sections with the same number of turns, resistance, and inductance.

Unless each coil has its sections in electrical balance, the magnetic flux in different portions of the coil within the operating range of the armature will be different for the same current flows and the corresponding armature will have a tendency to remain at or move to one or more definite positions in the coil. This is particularly noticeable and important in the instrument or receiver coil, as the position of the manometer armature is governed by the level of the sealing liquid and is not affected by forces which would cause the instrument armature to move.

In the construction illustrated, the manometer coil sections F' and F² are wound on a tube M, of insulating material such as bakelite which is adapted to fit over the tube E. As wound, the coil sections are separated by a bakelite disc M' and provided with a bakelite disc M² at each end of the coil. In carrying out my invention, discs N, preferably of sheet iron or steel, are positioned on the tube E above and below the upper and lower bakelite discs respectively. The addition of the metallic discs N causes a distortion in the magnetic field produced when the coil sections are energized by producing a more uniform flux in the portion of the corresponding coil section within the normal range of armature movement. In some cases where conditions permit one of the discs N can be eliminated.

The instrument coil K is provided with bakelite discs P' and P² corresponding in position to the manometer discs M' and M². In this construction each end disc P² is formed with a vertical flange P³ through which the coil K is secured to the instrument casing. The coil K is provided at each end with a plate Q which as shown in detail in Fig. 3, comprises a segmental front portion Q' having a circular opening Q² therein and a rear portion bent into a vertical flange Q³ which is provided with openings Q⁴ therein through which the plate may be held by the fastening means holding the discs P² and coil K on the instrument casing. Each plate Q is also formed with one or more prongs Q⁵ at the periphery of the opening Q² which are adapted to be moved in any direction to vary the magnetic flux of the coil as desired. While normally the prongs for each coil will be similarly bent, in some cases it is necessary to bend the prongs at each end in different directions.

In order to counteract any tendency of the armatures being drawn toward the nearest end plate Q or disc N while in the normal range of operation, each armature is made slightly longer than is usual in constructions having no end plates. The discs in the manometer have no prongs because of the position of the tube E and the corresponding armature is made slightly longer than the instrument armature.

My improved method and construction provide greatly improved float of the armatures through a greater distance than in coils which have no end plates. In the foregoing use of the term "float", that term is used to designate the condition in which the resultant magnetic force acting on the armature H, for example, and tending to cause motion of the pen connected to that armature is substantially zero, for all operating positions of the armature when the same current flows through both sections of the coil, so that the tendency for the armature to be drawn away from the correct operating position in which the inductance bridge is exactly balanced, due to irregular magnetic conditions, is negligible. The improved float attained eliminates any mutual effect of the indicators and recorders, provides a more accurate linear calibration, and practically eliminates the effect of voltage and frequency fluctuations in the supply current. The means employed are very simple in construction, low in manufacturing cost and easy to install.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In an electrical measuring system comprising an inductance bridge having a coil divided into sections and a magnetic body axially movable in said coil, the method of electrically balancing said coil sections and improving the float of said magnetic body which comprises introducing flux distorting material in one end of said coil.

2. In an electrical measuring system comprising an inductance bridge having a coil divided into a pair of end to end sections and an armature mechanically balanced and axially movable in said coil, the method of electrically balancing said coil sections and improving the float of said armature which comprises positioning a flux increasing member at one end of said coil and varying the position of a portion of said member relative to said coil in accordance with the magnetic field conditions present when said coil is energized.

3. An inductance bridge having a pair of coils, an armature extending partially into each coil, a magnetic member positioned at the distant ends of each of the coils for increasing the effective measuring stroke of the armature.

4. An inductance bridge having a pair of coils, an armature extending partially into each coil, a magnetic member positioned at the distant ends of each of the coils, said member being adjustable to balance the bridge.

5. An inductance bridge having a pair of axially aligned juxtaposition coils, an armature extending partially into each coil, a magnetic member positioned at the distant ends of each of the coils for increasing the effective measuring stroke of the armature.

6. An inductance bridge having a pair of axially aligned juxtaposition coils, an armature extending partially into each coil, a magnetic member positioned at the distant ends of each of the coils, said member being adjustable to balance the bridge.

7. An inductance bridge having a pair of axially aligned juxtaposition coils, an armature extending partially into each coil, a magnetic member positioned at the distant ends of each of the coils for increasing the effective measuring stroke of the armature, said member being distortable to balance the bridge.

Signed at Philadelphia, in the county of Philadelphia and State of Pennsylvania, this 4th day of January A. D. 1929.

THOMAS RANDOLPH HARRISON.